United States Patent
Ferris et al.

(10) Patent No.: US 6,385,986 B1
(45) Date of Patent: May 14, 2002

(54) REFRIGERANT CHARGING HOSE ASSEMBLY

(76) Inventors: James E. Ferris, 15 High Mesa Pl., Richardson, TX (US) 75080; William J. Quest, 5609 Ursula La., Dallas, TX (US) 75229

( * ) Notice: Subject to any disclaimer, the term of this patent is extended or adjusted under 35 U.S.C. 154(b) by 0 days.

(21) Appl. No.: 09/989,147

(22) Filed: Nov. 19, 2001

Related U.S. Application Data

(63) Continuation-in-part of application No. 09/829,087, filed on Apr. 9, 2001.

(51) Int. Cl.$^7$ ................................................ F25B 45/00
(52) U.S. Cl. ............................................. 62/292; 62/77
(58) Field of Search ...................................... 62/292, 77

(56) References Cited

U.S. PATENT DOCUMENTS

| | | | | |
|---|---|---|---|---|
| 3,785,163 A | * | 1/1974 | Wagner | 62/77 |
| 4,110,998 A | * | 9/1978 | Owen | 62/125 |
| 4,535,802 A | * | 8/1985 | Robertson | 137/322 |
| 5,246,045 A | * | 9/1993 | Clothier et al. | 141/95 |
| 5,388,417 A | * | 2/1995 | Hughes, Jr. et al. | 62/125 |
| 5,827,050 A | * | 10/1998 | Price | 417/207 |
| 5,875,638 A | * | 3/1999 | Tinsler | 62/149 |
| 6,155,066 A | * | 12/2000 | Chandler et al. | 62/292 |

* cited by examiner

Primary Examiner—William C. Doerrler
Assistant Examiner—Mark Shulman
(74) Attorney, Agent, or Firm—Konneker & Smith, P.C.

(57) ABSTRACT

A refrigerant charging hose assembly has an aerosol shut-off valve connectable to a refrigerant canister and interconnected to a disconnect coupler fitting by a length of refrigerant charging hose, the body portion of the coupler fitting being economically formed from high tensile strength elastomeric plastic material. A spring-loaded, floatingly supported control pin member is shifted to open the disconnect coupler fitting when the pin member engages and depresses a corresponding pin member within an air conditioning system service fitting to which the coupler fitting is connected. when the coupler fitting is removed from the service fitting the coupler fitting pin member is spring-driven back to its original position in which a flange portion thereof closes the coupler fitting to prevent discharge of pressurized refrigerant therethrough from the canister.

25 Claims, 5 Drawing Sheets

REFRIGERANT CHARGING HOSE ASSEMBLY

CROSS-REFERENCE TO RELATED APPLICATION

This application is a continuation-in-part of U.S. application Ser. No. 09/829,087 filed on Apr. 9, 2001 and entitled "REFRIGERANT CHARGING HOSE ASSEMBLY", such copending application being hereby incorporated herein in its entirety by reference.

BACKGROUND OF THE INVENTION

The present invention generally relates to air conditioning apparatus and, in a preferred embodiment thereof, more particularly relates to a charging hose assembly for adding refrigerant to an air conditioning refrigerant circuit from a canister containing pressurized refrigerant.

A common technique for adding a relatively small quantity of refrigerant to a refrigerant circuit of an air conditioning system, for example an automotive vehicle air conditioning system, is to interconnect a charging hose assembly between a suction line service fitting on the refrigerant circuit, and a small canister filled with pressurized refrigerant, and then flow at least some of the refrigerant from the canister into the circuit during operation of the system.

In one conventionally manufactured version thereof, the charging hose assembly includes (1) a length of refrigerant charging hose less than twelve inches long, (2) a piercing/dispensing shut-off valve connected to one end of the hose, and (3) a disconnect coupler fitting connected to the opposite end of the hose. To use the charging hose assembly, the shut-off valve is screwed onto a cylindrical outlet portion of the canister, and the coupler fitting is releasably locked onto the service fitting. When this is done, a fixed pin member within the coupler fitting depresses a corresponding opening pin within the service fitting to communicate the interior of the refrigerant circuit with the interior of the charging hose.

Next, the vehicle's engine is started, and the air conditioning system is operated in its maximum cooling mode. A handle on the installed shut-off valve is then (1) rotated in a first direction to cause an associated valve stem portion of the valve to pierce the outlet portion of the canister, and then (2) rotated in the opposite direction to communicate the interior of the canister with the interior of the charging hose so that refrigerant flow from the canister into the refrigerant circuit is initiated.

To terminate the refrigerant charging process, the handle of the shut-off valve is rotated in its first direction to close the shut-off valve and thereby block the flow through the hose of any pressurized refrigerant remaining in the canister. The disconnect coupler fitting is then removed from the refrigerant circuit service fitting. If the canister has been completely emptied of refrigerant in this process, the shut-off valve is then removed from the canister and the empty canister is discarded.

A potential problem exists in this refrigerant charging technique when a conventionally constructed charging hose is utilized—namely, the possibility that pressurized refrigerant will be undesirably discharged from the canister to the atmosphere if the above-described sequence is not precisely followed. This undesirable discharge of refrigerant to atmosphere can occur if, for example, the disconnect coupler fitting is removed from the service fitting before the shut-off valve is closed. If this is inadvertently done, any remaining pressurized refrigerant in the canister will simply be discharged to atmosphere through the removed disconnect coupler fitting. it is to this problem that the present invention is primarily directed.

SUMMARY OF THE INVENTION

In carrying out principles of the present invention, in accordance with a preferred embodiment thereof, a specially designed refrigerant charging hose assembly is provided which comprises a length of refrigerant charging hose having first and second ends, a shut-off valve secured to the first hose end, and a uniquely configured disconnect coupler fitting secured to the second end of the charging hose. The shutoff valve is releasably connectable to an outlet portion of a pressurized refrigerant storage canister, and the disconnect coupler fitting is releasably connectable to a refrigerant circuit service fitting having a depressible opening pin portion. In a first illustrated embodiment of the charging hose assembly the shut-off valve is representatively a threaded stem piercing/dispensing type shut-off valve, and in another illustrated embodiment of the charging hose assembly the shut-off valve is representatively a push-button type aerosol can actuator valve.

According to a primary aspect of the invention, the disconnect coupler fitting includes control means for (1) depressing the service fitting opening pin and permitting refrigerant flow through the disconnect coupler fitting, in response to connection of the disconnect coupler fitting to the service fitting, and (2) precluding refrigerant flow through the disconnect coupler fitting in response to removal of the disconnect coupler fitting from the service fitting. when the charging hose assembly incorporates a piercing/dispensing type shut-off valve at its canister end, even if a user of the charging hose assembly forgets to close the shut-off valve before removing the disconnect coupler fitting from the service fitting, remaining pressurized refrigerant in the canister will not be discharged to the atmosphere through the disconnect coupler fitting when it is removed from the service fitting. When the push-button type shut-off valve is used at the canister end of the charging hose assembly, this desirable feature of the disconnect coupler fitting is augmented by the canister shut-off valve which terminates refrigerant outflow from the canister when the valve's push button is released.

Representatively, the disconnect coupler fitting control means include a control structure floatingly carried within a generally tubular body portion of the disconnect coupler fitting for axial movement relative thereto between (1) a first or closed position in which the control structure sealingly engages a seal structure within the coupler fitting body and precludes refrigerant through therethrough, and (2) a second or open position in which the control structure is moved away from the seal structure and permits refrigerant flow through the coupler fitting body. In a preferred embodiment thereof, the control structure includes a pin portion which engages and depresses the opening pin of the service fitting when the coupler fitting is connected the service fitting, the forcible engagement between these two pin portions shifting the control structure to its second position.

The seal structure is representatively a single annular resilient seal member which is captively and stationarily retained within the body portion, with the body portion refrigerant flow passage extending through the interior of the annular seal member. when the disconnect coupler fitting is installed on the service fitting the service fitting body is brought into sealing engagement with the seal structure.

Thus, the single stationary seal member is sealingly contactable by both the service fitting and the floating control structure.

A spring structure resiliently biases the control structure toward its first or closed position. Accordingly, when the two pin portions are disengaged as the coupler fitting is being removed from the service fitting, the control structure is automatically spring-driven back to its first or closed position to preclude pressurized refrigerant from the canister from being forced outwardly through the removed coupler fitting in the event that the canister shut-off valve is inadvertently left or held in its open position with pressurized refrigerant remaining in the canister.

According to another feature of the invention, the hollow body portion of the disconnect coupler fitting is of a plastic material, and the control structure is of a metal construction. Representatively, the hollow body portion of the disconnect coupler fitting is configured for operative engagement with an R134a refrigerant circuit service fitting.

DETAILED DESCRIPTION

Figure 1:
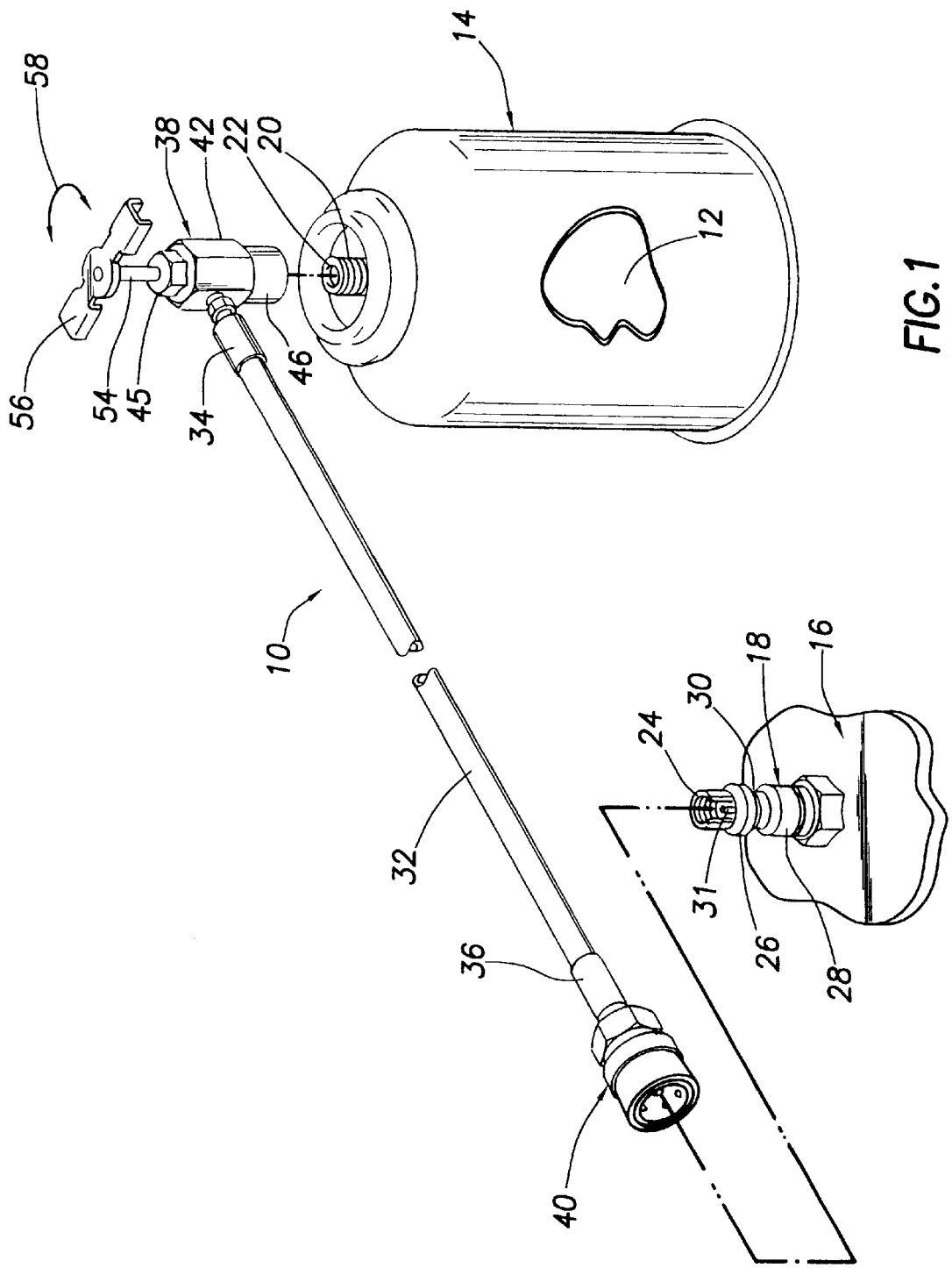
FIG. 1 is a perspective view of a specially designed refrigerant charging hose assembly embodying principles of the present invention and used to transfer R134a refrigerant from the illustrated pressurized refrigerant canister to the illustrated low side service fitting of an automotive vehicle air conditioning system.

Perspectively illustrated in longitudinally foreshortened form in FIG. 1 is a specially designed refrigerant charging hose assembly 10 (see also FIG. 4) that embodies principles of the present invention and is useable to flow pressurized refrigerant 12, disposed within a conventional pressurized refrigerant storage canister 14, into an automotive vehicle air conditioning system 16 via its low side refrigerant circuit service fitting 18. Representatively, the refrigerant 12 is R134a refrigerant and the service fitting 18 is a conventionally configured R134a refrigerant service fitting. While the charging hose assembly 10 of the present invention will be illustratively described as being used with the R134a refrigerant circuit of an automotive vehicle air conditioning system, it will be readily appreciated by those Of skill in the air conditioning and refrigeration art that principles of this invention could alternatively be utilized with air conditioning refrigerant circuits of other types, and in conjunction with other types of refrigerant.

Canister 14 has, at its top end, an upwardly projecting, externally threaded cylindrical outlet portion 20 with a puncturable top end wall 22. Service fitting 18 is of a hollow, generally tubular configuration and has an open inlet end 24, an axially spaced pair of annular exterior flange portions 26 and 28, and a reduced diameter annular exterior locking recess 30 disposed between the flanges 26 and 28.

Coaxially disposed within the body of the service fitting 18 is a spring-loaded opening pin 31 secured to an internal valve member (not shown). The opening pin 31 is resiliently biased upwardly to a closed position shown in FIG. 1 in which the associated valve member closes off the interior of the fitting 18 to prevent refrigerant flow outwardly therethrough. Vertical depression of the pin 31, on the other hand, opens the interior of the service fitting body to permit refrigerant flow therethrough.

The refrigerant charging hose assembly 10 includes a length of R134a refrigerant charging hose 32 having tubular metal connector fittings 34 4. and 36 fixedly secured to its opposite ends. Fitting 34 is permanently anchored to a conventional threaded stem piercing/dispensing type shutoff valve 38 operatively and releasably connectable to the canister outlet portion 20 in a manner subsequently described herein, and fitting 36 is permanently anchored to a specially designed disconnect coupler fitting 40 operatively and releasably connectable to the service fitting 18, also in a manner subsequently described herein. Since the charging hose assembly 10 has only a single shut-off valve (namely, the valve 38), the length of the hose 32 is less than twelve inches in order to maintain the assembly 10 in compliance with the provisions of the Clean Air Act Amendments of 1990 dictating that a refrigerant service hose used in conjunction with an automotive air conditioning system be provided with shut-off valves within twelve inches of its opposite ends. when the refrigerant charging hose assembly is operatively interconnected between the canister 14 and the service fitting 18 (see FIG. 4), the assembly 10 is operative to flow pressurized refrigerant 12 from the canister 14 into the automotive vehicle air conditioning system 16 via the hose 12.

Figure 2:
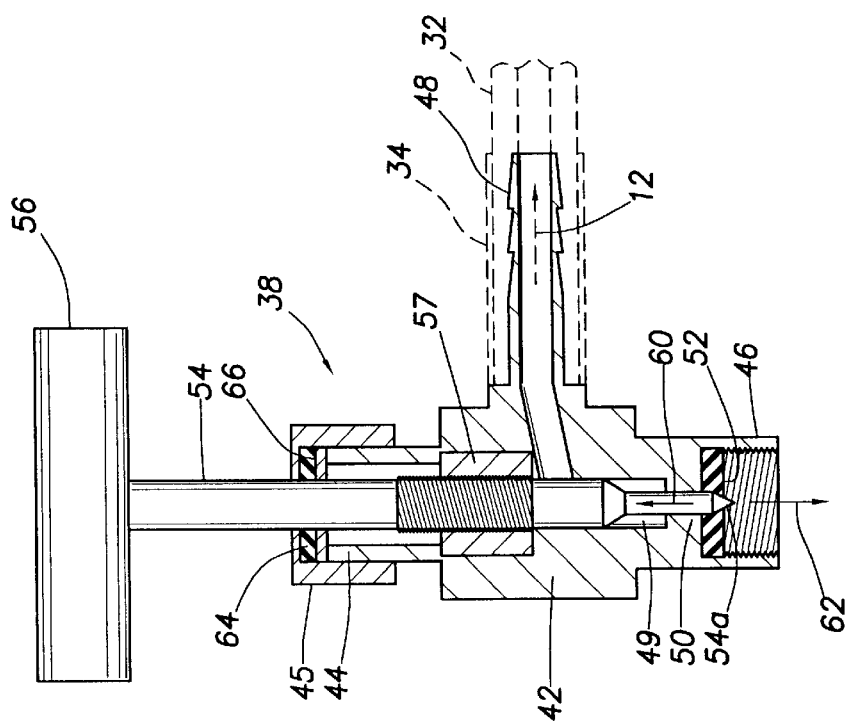
FIG. 2 is an enlarged scale cross-sectional view through a dispensing shut-off valve portion of the charging hose assembly.

Turning now to FIG. 2, the dispensing shut-off valve 38 has a hollow, generally tubular plastic body portion 42 with an upper end 44 closed by a plastic nut member 45 threadingly secured thereto, an internally threaded tubular bottom inlet end portion 46 threadable onto the canister outlet portion 20 (see FIG. 1), and a barbed side outlet portion 48 received in and permanently anchored to an end portion of the hose 32 by the tubular metal connector fitting 34. The interior of the bottom inlet end portion 46 communicates with an axial interior passage 49 within the body portion 42, with the passage 49 communicating, in turn, with the interior of the side outlet portion 48.

Coaxially disposed within the inlet end portion 46 is an annular support flange portion 50 having an annular resilient sealing gasket 52 on its bottom side. A vertically oriented metal valve stem 54, having a transverse handle portion 56 secured to its upper end, is threadingly secured to a threaded tubular metal insert 57 suitably and coaxially anchored within the interior of the plastic body portion 42. Using the handle 56 to rotate the stem 54 about its longitudinal axis, as indicated by the double-ended arrow 58 in FIG. 1, the valve 38 may be selectively oriented in (1) an open, refrigerant flow permitting position in which the stem 54 is shifted upwardly within the body 42 (as indicated by the arrow 60 in FIG. 2), or (2) a closed, refrigerant flow shut-off position in which the stem 54 is downwardly shifted to its FIG. 2 position (as indicated by the arrow 62 in FIG. 2) in which the pointed lower end 54a of the stem extends downwardly through and beyond the gasket 52. An upper end portion of the stem 54 extends through annular rubber and metal gaskets 64,66 captively retained in an upper interior portion of the plastic nut member 45.

Figure 3:
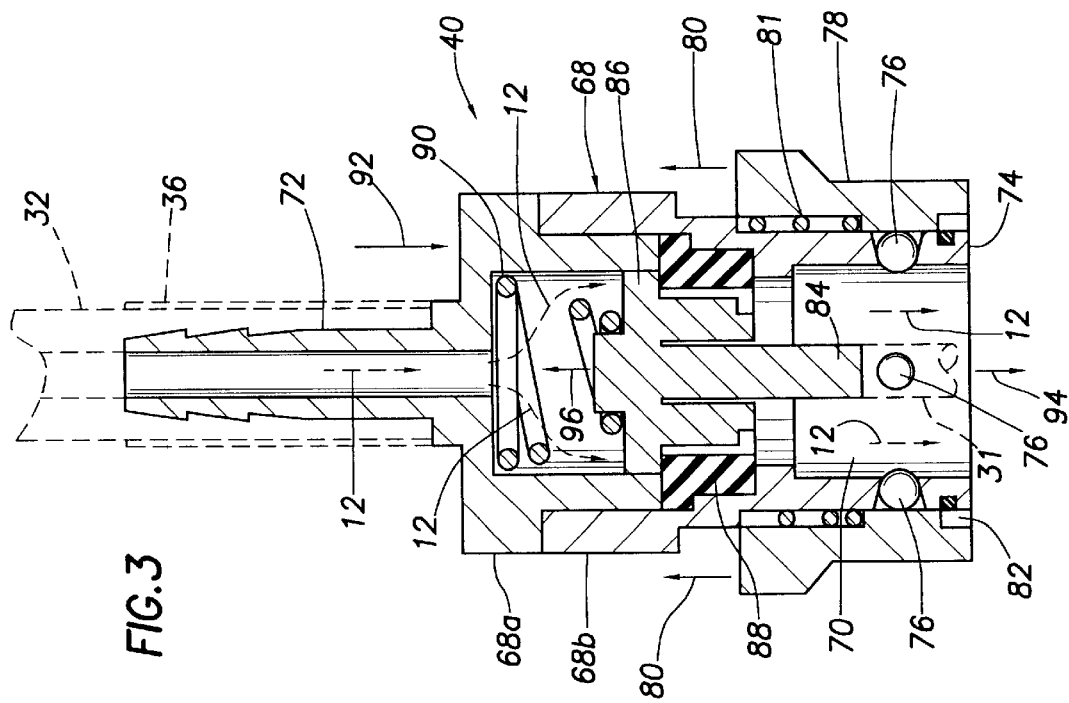
FIG. 3 is an enlarged scale cross-sectional view through a specially designed disconnect coupler fitting portion of the charging hose assembly.

Turning now to FIG. 3, the specially designed disconnect coupler fitting 40 has a tubular body portion 68 defined by a tubular upper plastic body section 68a having a lower end portion telescoped and suitably anchored within the upper end portion of a tubular lower plastic body section 68b. An interior flow passage 70 within the body 68 opens outwardly through a hollow barbed top end inlet portion 72, and also opens outwardly through the open lower end 74 of the lower body section 68b. The barbed inlet portion 72 is received in an end portion of the hose 32 and is fixedly anchored thereto by the tubular metal connector fitting 36.

A circumferentially spaced series of locking balls 76 are carried in corresponding holes in a lower side wall portion of the body section 68b, adjacent its open lower end 74, and are radially movable between an inwardly shifted FIG. 3 locking position in which portions of the balls 76 project radially inwardly beyond the interior side surface of the body section 68b, and an outwardly shifted release position (not shown) in which the radially inner sides of the balls are generally flush with the interior side surface of the body section 68b.

An annular locking collar 78 is coaxially and slidably mounted exteriorly on the lower body section 68b and is axially movable relative thereto between a FIG. 3 locking position in which the bottom end of the collar 78 is generally flush with the lower end 74 of the body section 68b, and a release position (not shown) in which, as indicated by the arrows 80 in FIG. 3, the collar 78 is upwardly shifted relative to the body section 68b away from the locking position of the collar 78. A spring structure 81 is captively retained as indicated between the lower body section 68b and the collar 78 and biases the collar 78 downwardly toward its FIG. 3 locking position.

As illustrated in FIG. 3, an annular interior side surface recess 82 is formed in the collar 78 at its lower end. With the collar 78 in its FIG. 3 locking position, the recess 82 is disposed beneath the balls 76, and an interior side surface of the collar 78 above its interior side surface recess 82 holds the balls 76 in their locking positions. However, when the collar 78 is upwardly shifted to its release position, as indicated by the arrows 80, the reduced diameter interior side surface recess 82 is brought into vertical alignment with the balls 76 to permit them to be radially outwardly shifted to their release positions.

A vertically oriented control pin member 84 is coaxially and movably received within the flow passage 70 and has a radially enlarged annular sealing flange portion 86 at its top end. Flange portion 86 overlies an inner peripheral portion of an annular resilient sealing member 88 captively and stationarily retained, as indicated in FIG. 3, between facing annular ledge portions of the body sections 68a,68b. Flow passage 70 vertically extends through the interior of the annular sealing member 88. A spring structure 90 captives retained within the upper body section 68a bears downwardly against the flange portion 86 and resiliently biases the pin member 84 downwardly toward its FIG. 3 closed position in which the flange portion 86 sealingly engages a radially inner upper end portion of the sealing member 88 in a manner preventing fluid flow through the flow passage 70 upwardly or downwardly across the flange portion 86.

Figure 4:
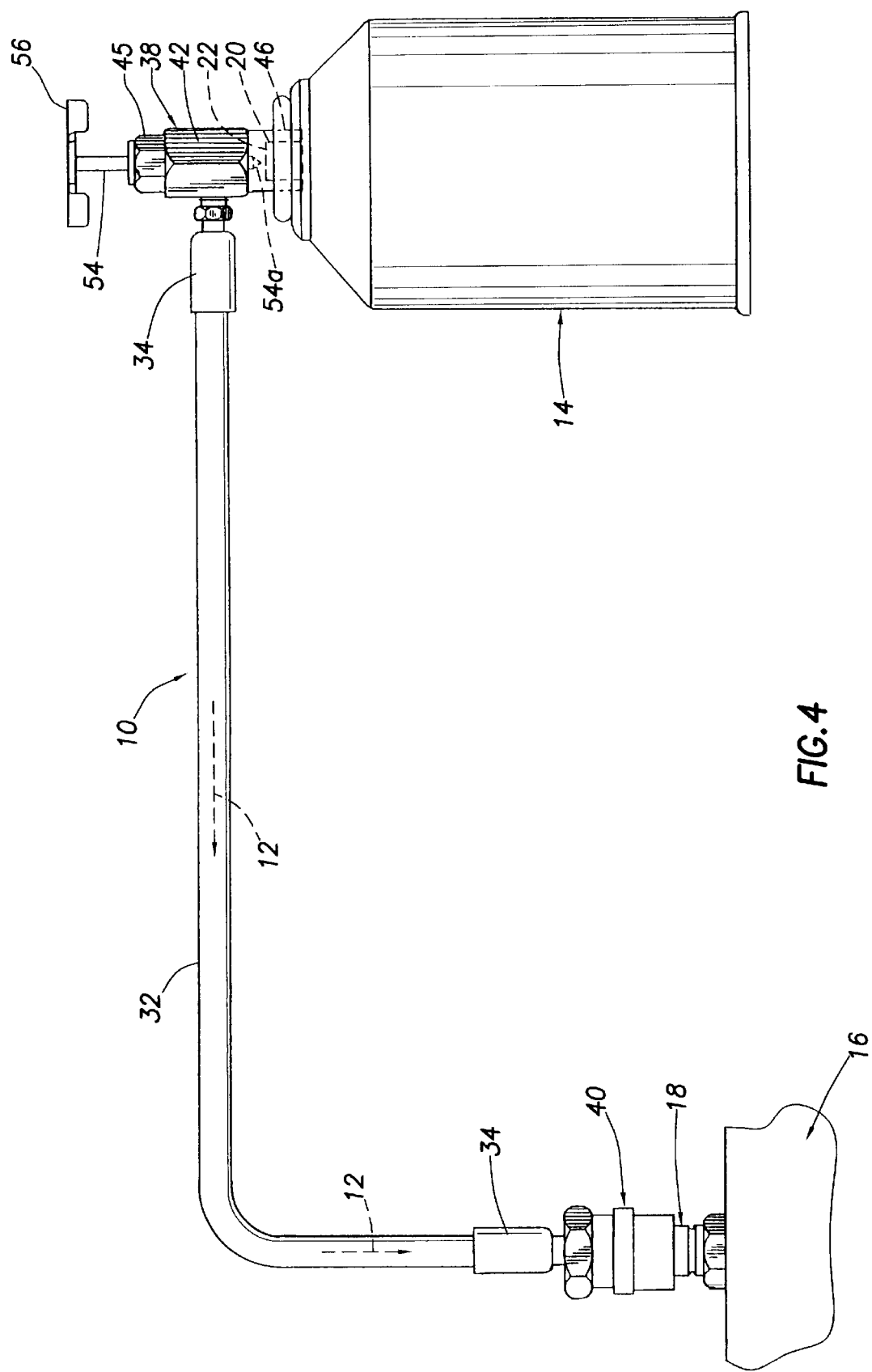
FIG. 4 is a side elevational view of the charging hose assembly being used to transfer R134a refrigerant from the canister to the refrigerant circuit service fitting.

To use the refrigerant charging hose assembly 10 to transfer pressurized R134a refrigerant 12 from the canister 14 to the automotive vehicle air conditioning system 16 as shown in FIG. 4, valve stem 54 is upwardly moved to its open position (in which the stem 54 is upwardly shifted away from its FIG. 2 position), and the bottom end portion 46 of the dispensing shut-off valve body 42 is screwed onto the outlet portion 20 of the refrigerant canister 14 in a manner bringing the upper end of the canister outlet portion 20 into sealing engagement with the gasket 52 within the interior of the bottom end portion 46 of the valve 38.

The specially designed disconnect coupler fitting 40 of the present invention is then operatively connected to the service fitting 18 by moving the collar 78 upwardly to its previously described release position, pushing the open valve body lower end 74 downwardly over the service fitting 18, as indicated by the arrow 92 in FIG. 3, to (1) cause an upper end portion of the service fitting 18 to sealingly engage the sealing member 88, (2) downwardly engage the control pin 84 with the spring-loaded pin portion 31 of the service fitting 18, and (3) align the locking balls 76 with the service fitting exterior annular recess 30. The collar 78 is then released, thereby permitting the spring 81 to downwardly return the collar 78 to its FIG. 3 locking position in which the locking balls 76 enter the annular service fitting recess 30 to sealingly and releasably lock the service fitting 18 within the interior of the lower valve body section 68b beneath the sealing gasket member 88.

With the disconnect coupler fitting 40 releasably locked on the service fitting 18 in this manner, the floatingly supported control pin member 84 depresses the spring-loaded service fitting pin 31 (as indicated by the arrow 94 in FIG. 3) to open the service fitting 18. The forcible engagement between the control pin member 84 and the service fitting pin 31 which depresses the service fitting pin 31 also axially and upwardly shifts the control pin member 84 (as indicated by the arrow 96 in FIG. 3) to its open position in which its sealing flange portion 86 is lifted off the annular resilient sealing member 88, thereby communicating the interior of the air conditioning system 16 with the interior of the hose 32 via the valve flow passage 70 and the opened service fitting 18.

Next, the vehicle's engine is started, and the air conditioning system 16 is operated in its maximum cooling mode. The dispensing/shut-off valve handle 56 (see FIG. 2) is then rotated in a clockwise direction to move the piercing valve stem 54 downwardly from its open position to cause the pointed lower stem end 54a to pierce the top end wall 22 of the canister outlet portion 20. The valve handle 56 is then rotated in a counterclockwise direction to return the valve 38 to its original open position in which the interior of the barbed outlet portion 48 is communicated with the interior flow passage 49 of the valve 38, and the lower stem end 54a is upwardly removed from the puncture hole it created in the canister outlet portion end wall 22, thereby permitting pressurized R134a refrigerant 12 to sequentially flow from the canister 14, through the interior 49 of the shut-off valve 38 (see FIG. 2), the side outlet portion 48, the hose 32, the inlet portion 72 (see FIG. 3), the interior 70 of the disconnect coupler fitting 40, and into the interior of the air conditioning system 16 (see FIGS. 1 and 4) via the opened service fitting 18.

After the canister 14 is emptied in this manner, the valve handle 54 is again turned in a clockwise direction to close the valve 38, the disconnect coupler fitting 40 is removed from the service fitting 18 by moving the coupler collar 78 upwardly from its FIG. 3 position, and then removing the disconnect coupler fitting 40 from the service fitting 18, thereby permitting the service fitting pin 31 to be spring-driven upwardly to close the service fitting. The dispensing shut-off valve 38 is then removed from the canister 14 and the empty canister 14 is discarded.

When using a conventionally constructed refrigerant charging hose assembly, this operational sequence just described must be carefully followed to prevent the undesirable expulsion of refrigerant 12 from the canister 14 to the atmosphere. Specifically, prior art refrigerant hose disconnect couplings which are removably connectable to the service fitting 18 have internal control pin members (used to depress the service fitting pin 31) which are fixedly secured to the balance of the disconnect coupling in a manner such that refrigerant may always flow through the interior of the disconnect coupling.

Accordingly, if only a portion of the refrigerant 12 is dispensed from the canister into the air conditioning system 16 using a conventional charging hose assembly, and the dispensing shut-off valve is not re-closed before the disconnect coupling is removed from the service fitting, the balance of refrigerant in the pressurized canister will simply be discharged to atmosphere via the removed, conventionally constructed disconnect coupling.

This potential problem is eliminated in the refrigerant charging hose it. assembly of the present invention via the unique incorporation therein of the spring-loaded, floatingly supported control pin member 84 shown in FIG. 3. Due to the use of this floatingly supported control pin member 84, even if the dispensing shut-off valve 38 is not re-closed before the disconnect coupler fitting 40 is removed from the service fitting 18, no appreciable amount of pressurized refrigerant 12 remaining in the canister 14 will be discharged to atmosphere via the removed disconnect coupler fitting 40. This is due to the fact that upon the removal of the disconnect coupler fitting 40 from the service fitting 18 the control pin member 84 is disengaged from the service fitting's spring-loaded pin 31, whereupon the spring 90 downwardly and axially snaps the control pin member flange 86 back into sealing engagement with the annular sealing member 88 (see FIG. 3) to thereby close off the disconnect coupler fitting 40 and prevent the discharge of pressurized refrigerant 12 from its open lower end 74. It should be noted that the single resilient seal member 88 is used to operatively and sealingly engage both the pin member flange 86 and the service fitting 18 in the course of use of the specially designed disconnect coupling fitting 40.

In addition to this important operational benefit incorporated into the refrigerant charging hose assembly 10, the substantial use of plastic in the valves 38 and 40 desirably reduces both the weight and cost of the assembly 10.

Figure 5:
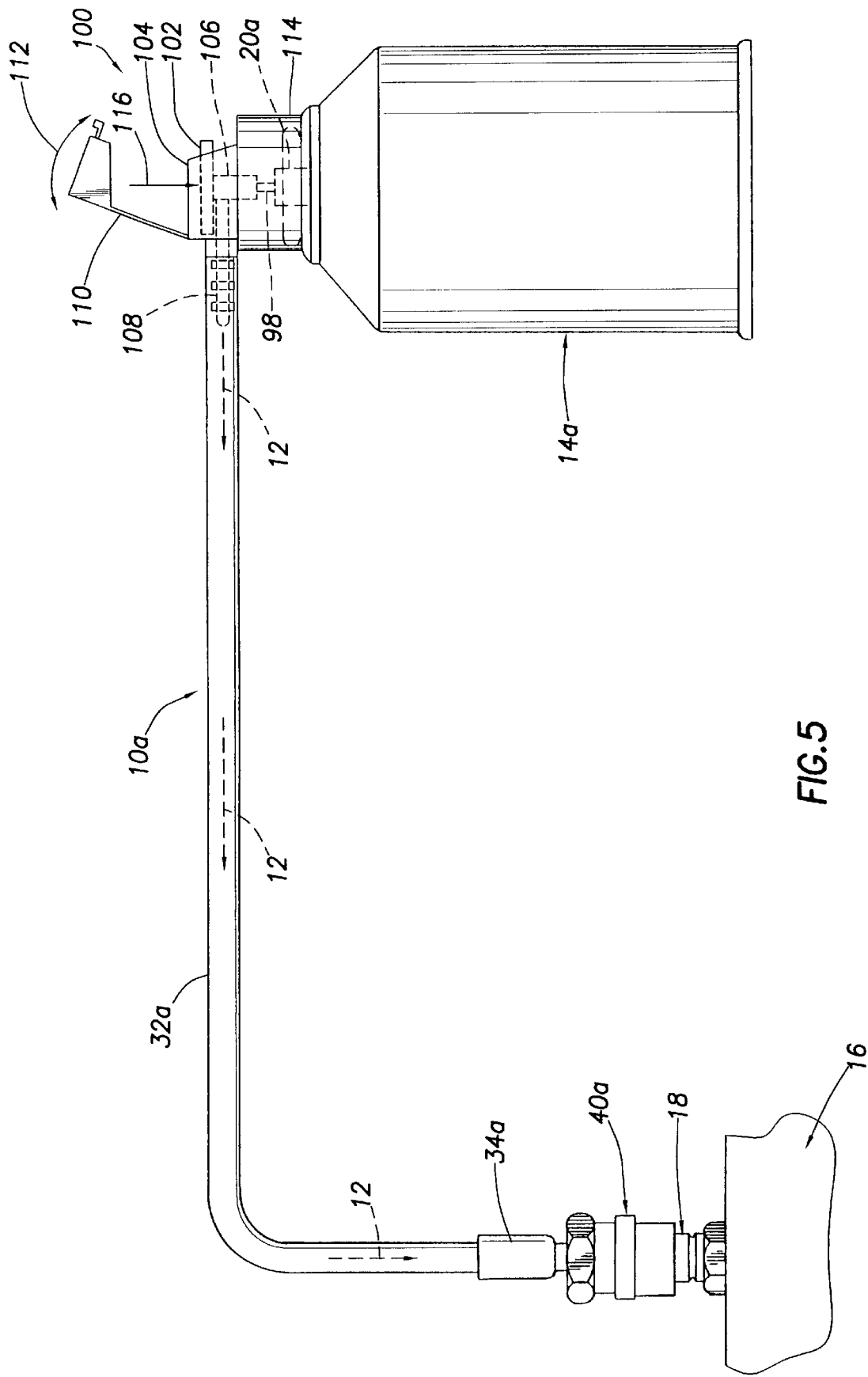
FIG. 5 is a side elevational view of an alternate embodiment of the charging hose assembly being used to transfer R134a refrigerant from the canister to the refrigerant circuit service fitting.

An alternate embodiment 10*a* of the previously described refrigerant charging hose assembly 10 is illustrated in FIG. 5. For ease in comparing the two embodiments 10 and 10*a*, components in the alternate embodiment 10*a* similar to those in the previously described embodiment 10 have been given the same reference numerals to which the subscript "a" has been added.

The pressurized refrigerant storage canister 14*a* to which the charging hose assembly 10*a* is connectable as shown in FIG. 5 has, at its upper end, a nonthreaded outlet portion 20*a* from which a spring-loaded, resiliently depressible canister discharge tube 98 upwardly projects. Instead of the previously described dispensing shut-off valve 38, the charging hose 32*a* has a conventional push-button type aerosol shut-off valve 100 operatively connected to its canister end (i.e., the right end of the hose 32*a* as viewed in FIG. 5). Valve 100 is removably snap-fittable onto the upper end of the canister 14*a* and has a push button portion 102 disposed at the open upper end 104 of the valve 100 and secured to an underlying inlet tube 106 that sealingly fits over the canister discharge tube 98. A hollow, barbed outlet tube 108 is transversely secured to the inlet tube 106, communicates with its interior, and extends into the right end of the charging hose 32*a*.

A hinged lid 110 is secured to the upper end 104 of the valve 100 and is pivotable, as indicated by the double-ended arrow 112, between an open position (shown in FIG. 5) in which the push button 102 is exposed, and a closed position (not shown) in which the lid 110 releasably snaps onto a tubular base portion 114 of the valve 100 and covers the push button 102.

With the valve 100 releasably snapped onto the upper end of the canister 14*a*, and the disconnect coupler fitting 40 releasably connected to the service fitting 18 as shown in FIG. 5, refrigerant 12 is forced from the canister 14*a* into the air conditioning system 16 simply by depressing the push button 102 as indicated by the arrow 116 in FIG. 5. This depresses the canister outlet tube 98, thereby causing pressurized refrigerant 12 from within the canister 14a to sequentially flow upwardly through the interiors of the tubes 98, 106 and 108 and into the interior of a right end portion of the charging hose 32*a* for delivery into the air conditioning system 16. The flow of pressurized refrigerant 12 through the hose 32 may be terminated by simply releasing the push button 102, thereby permitting the canister outlet tube 98 to be upwardly spring-driven back to its normally closed position. The use of the push-button valve 100 at the canister end of the charging hose assembly 10*a* augments the refrigerant flow shut-off function of the disconnect coupler fitting 40 in that refrigerant outflow from the canister 14a is terminated in response to release of the push button 102.

Figure 6:
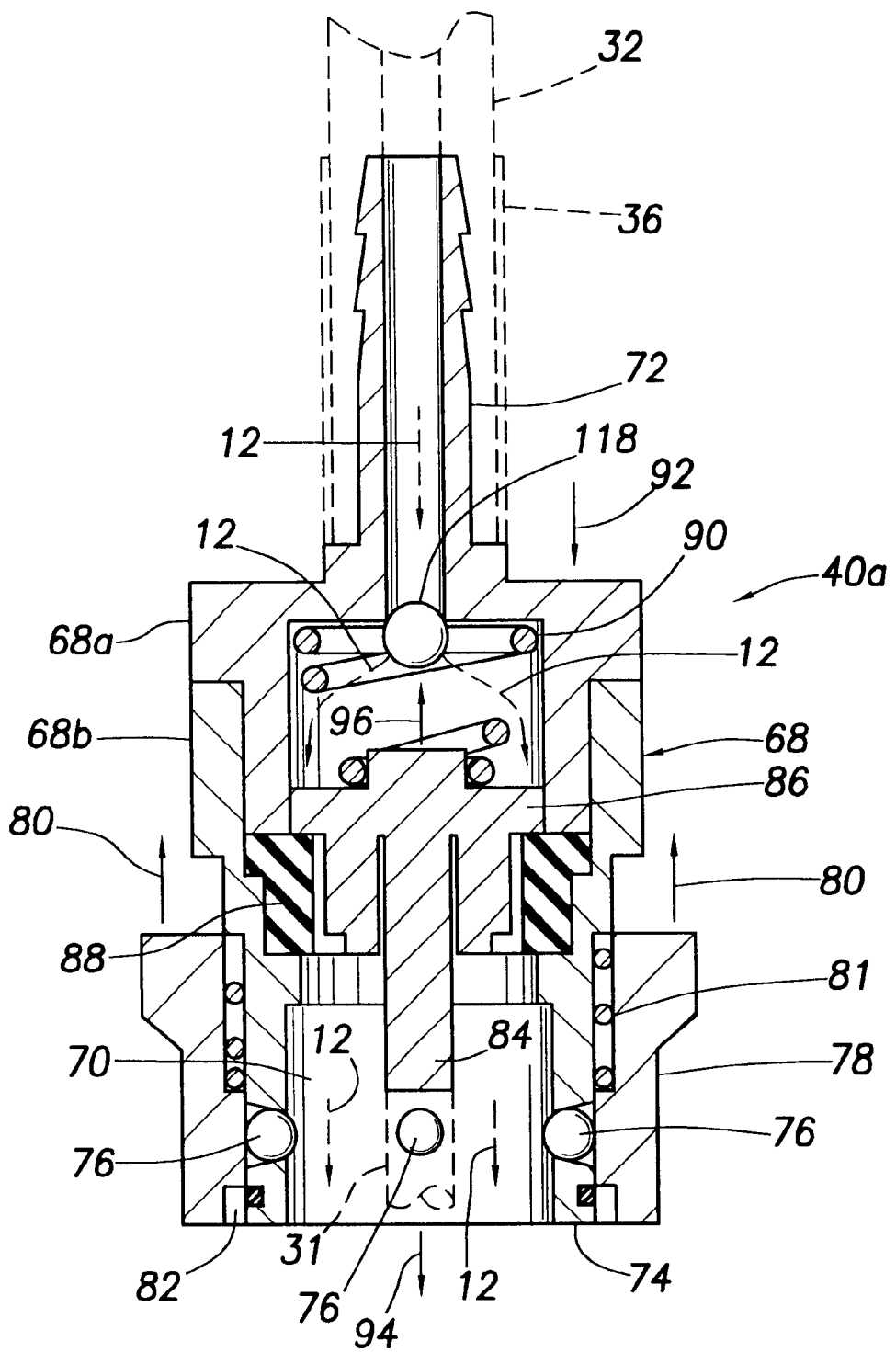
FIG. 6 is an enlarged scale cross-sectional view of the disconnect coupler fitting portion of the FIG. 5 charging hose assembly.

With reference not to FIGS. 5 and 6, the disconnect coupler fitting 40*a* incorporated in the refrigerant charging hose assembly 10*a* is similar to the previously described disconnect coupler fitting 40 (see FIG. 3) with the exception that a spherical stop member 118 (preferably formed from a resilient material such as rubber) is floatingly disposed within the interior of the body section 68 of the disconnect coupler fitting 40*a* above the upper end of the control pin member 84 (see FIG. 6). This floating spherical stop member 118 prevents upward flow of refrigerant 12 through the interior of the barbed outlet portion 72, when the control pin member 84 is upwardly shifted, by sealingly blocking its lower end at the onset of a fluid pressure condition which would otherwise permit such upward refrigerant flow. The stop member 118, which serves as a floating check valve element, is pressure-shifted downwardly from its FIG. 6 sealing orientation to permit the desired downward flow of refrigerant 12 through the fitting 40*a*.

The foregoing detailed description is to be clearly understood as being given by way of illustration and example only, the spirit and scope of the present invention being limited solely by the appended claims.

What is claimed is:

1. A refrigerant charging hose assembly comprising:
    an aerosol shut-off valve releasably connectable to an outlet portion of a refrigerant storage canister;
    a disconnect coupler fitting including:
        a hollow body releasably connectable to a refrigerant circuit service fitting having a depressible opening pin therein,
        a hollow resilient seal member captively and stationarily retained within said hollow body, with a refrigerant flow passage extending through the interior of said seal member, said seal member having a first portion sealingly engageable by the service fitting when said hollow body is connected thereto, and a second portion, a control structure carried within said hollow body and operative, in response to connection of said hollow body to the service fitting, to engage and depress the depressible opening pin of the service fitting along an axis, said control structure being moveable relative to said hollow body along said axis between first and second positions in which said control structure respectively (1) sealingly engages said second portion of said sealing member and precludes refrigerant flow through said refrigerant flow passage, and (2) is shifted out of sealing engagement with said second portion of said sealing member and permits refrigerant flow through said refrigerant flow passage, and a spring structure resiliently biasing said control structure toward said first position; and a refrigerant charging hose connected at its opposite ends to said aerosol shut-off valve and said disconnect coupler fitting.

2. The refrigerant charging hose assembly of claim 1 wherein:

said aerosol shut-off valve is a threaded stem piercing/dispensing type shut-off valve.

3. The refrigerant charging hose assembly of claim 1 wherein:

said aerosol shut-off valve is push-button type aerosol can actuator valve.

4. The refrigerant charging hose assembly of claim 1 wherein:

said hollow resilient seal member has an annular configuration and is captively and stationarily retained between two facing annular surfaces of said hollow body.

5. The refrigerant charging hose assembly of claim 1 wherein:

said hollow resilient seal member has an annular configuration, and said control structure includes a pin portion for operatively engaging the depressible opening pin of the service fitting, and a radially enlarged annular flange portion engaged by said spring structure and being movable along said axis into and out of sealing engagement with said second portion of said sealing member.

6. The refrigerant charging hose assembly of claim 1 wherein:

said charging hose is less than twelve inches long.

7. The refrigerant charging hose assembly of claim 1 wherein:

said hollow body has a generally tubular configuration and a circumferentially spaced series of holes radially extending through a side all portion thereof, and said disconnect coupler fitting further includes:

a series of locking balls radially movably carried in said holes, a locking collar exteriorly and coaxially carried on said hollow body radially outwardly of said locking balls and being axially movable relative to said hollow body between first and second positions in which said locking collar respectively (1) engages said locking balls with a first interior side surface portion of said locking collar, in a manner keeping side portions of said locking balls within the interior of said hollow body portion, and (2) permits said side portions of said locking balls to be forced out of the interior of said hollow body portion in a manner moving said locking balls into engagement with a second interior side surface portion of said locking collar, and a spring structure resiliently biasing said locking collar toward said first position thereof.

8. The refrigerant charging hose assembly of claim 1 wherein:

said hollow body is of a plastic material, and said control structure is of a metal construction.

9. The refrigerant charging hose assembly of claim 1 wherein:

said hollow body is configured for operative engagement with an R134a refrigerant circuit service fitting.

10. Refrigerant charging apparatus comprising:

a pressurized refrigerant storage canister having an outlet portion;

an aerosol shut-off valve releasably connectable to said outlet portion;

a disconnect coupler fitting including:

a hollow body releasably connectable to a refrigerant circuit service fitting having a depressible opening pin therein, a hollow resilient seal member captively and stationarily retained within said hollow body, with a refrigerant flow passage extending through the interior of said seal member, said seal member having a first portion sealingly engageable by the service fitting when said hollow body is connected thereto, and a second portion, a control structure carried within said hollow body and operative, in response to connection of said hollow body to the service fitting, to engage and depress the depressible opening pin of the service fitting along an axis, said control structure being moveable relative to said hollow body along said axis between first and second positions in which said control structure respectively (1) sealingly engages said second portion of said sealing member and precludes refrigerant flow through said refrigerant flow passage, and (2) is shifted out of sealing engagement with said second portion of said sealing member and permits refrigerant flow through said refrigerant flow passage, and a spring structure resiliently biasing said control structure toward said first position; and a refrigerant charging hose connected at its opposite ends to said aerosol shut-off valve and said disconnect coupler fitting.

11. The refrigerant charging apparatus of claim 10 wherein:

said aerosol shut-off valve is a threaded stem piercing/dispensing type shut-off valve.

12. The refrigerant charging apparatus of claim 10 wherein:

said aerosol shut-off valve is push-button type aerosol can actuator valve.

13. The refrigerant charging apparatus of claim 10 wherein:

said hollow resilient seal member has an annular configuration and is captively and stationarily retained between two facing annular surfaces of said hollow body.

14. The refrigerant charging apparatus of claim 10 wherein:

said hollow resilient seal member has an annular configuration, and said control structure includes a pin portion for operatively engaging the depressible opening pin of the service fitting, and a radially enlarged annular flange portion engaged by said spring structure and being movable along said axis into and out of sealing engagement with said second portion of said sealing member.

15. The refrigerant charging apparatus of claim 10 wherein:

said charging hose is less than twelve inches long.

16. The refrigerant charging apparatus of claim 10 wherein:

said hollow body has a generally tubular configuration and a circumferentially spaced series of holes radially extending through a side all portion thereof, and said disconnect coupler fitting further includes:
a series of locking balls radially movably carried in said holes,
a locking collar exteriorly and coaxially carried on said hollow body radially outwardly of said locking balls and being axially movable relative to said hollow body between first and second positions in which said locking collar respectively (1) engages said locking balls with a first interior side surface portion of said locking collar, in a manner keeping side portions of said locking balls within the interior of said hollow body portion, and (2) permits said side portions of said locking balls to be forced out of the interior of said hollow body portion in a manner moving said locking balls into engagement with a second interior side surface portion of said locking collar, and
a spring structure resiliently biasing said locking collar toward said first position thereof.

17. The refrigerant charging apparatus of claim 10 wherein:

said hollow body is of a plastic material, and said control structure is of a metal construction.

18. The refrigerant charging apparatus of claim 10 wherein:

said hollow body is configured for operative engagement with an R134a refrigerant circuit service fitting.

19. A disconnect coupler fitting for use on a refrigerant charging hose assembly, said disconnect coupler fitting comprising:

a hollow body releasably connectable to a refrigerant circuit service fitting having a depressible opening pin therein;

a hollow resilient seal member captively and stationarily retained within said hollow body, with a refrigerant flow passage extending through the interior of said seal member, said seal member having a first portion sealingly engageable by the service fitting when said hollow body is connected thereto, and a second portion;

a control structure carried within said hollow body and operative, in response to connection of said hollow body to the service fitting, to engage and depress the depressible opening pin of the service fitting along an axis, said control structure being moveable relative to said hollow body along said axis between first and second positions in which said control structure respectively (1) sealingly engages said second portion of said sealing member and precludes refrigerant flow through said refrigerant flow passage in a first direction, and (2) is shifted out of sealing engagement with said second portion of said sealing member and permits refrigerant flow through said refrigerant flow passage in said first direction; and a spring structure resiliently biasing said control structure toward said first position.

20. The disconnect coupler fitting of claim 19 wherein:

said hollow resilient seal member has an annular configuration and is captively and stationarily retained between two facing annular surfaces of said hollow body.

21. The disconnect coupler fitting of claim 19 wherein:

said hollow resilient seal member has an annular configuration, and said control structure includes a pin portion for operatively engaging the depressible opening pin of the service fitting, and a radially enlarged annular flange portion engaged by said spring structure and being movable along said axis into and out of sealing engagement with said second portion of said sealing member.

22. The disconnect coupler fitting of claim 19 wherein:

said hollow body has a generally tubular configuration and a circumferentially spaced series of holes radially extending through a side wall portion thereof, and said disconnect coupler fitting further includes:
a series of locking balls radially movably carried in said holes,
a locking collar exteriorly and coaxially carried on said hollow body radially outwardly of said locking balls and being axially movable relative to said hollow body between first and second positions in which said locking collar respectively (1) engages said locking balls with a first interior side surface portion of said locking collar, in a manner keeping side portions of said locking balls within the interior of said hollow body portion, and (2) permits said side portions of said locking balls to be forced out of the interior of said hollow body portion in a manner moving said locking balls into engagement with a second interior side surface portion of said locking collar, and
a spring structure resiliently biasing said locking collar toward said first position thereof.

23. The disconnect coupler fitting of claim 19 wherein:

said hollow body is of a plastic material, and said control structure is of a metal construction.

24. The disconnect coupler fitting of claim 19 wherein:

said hollow body is configured for operative engagement with an R134a refrigerant circuit service fitting.

25. The disconnect coupler fitting of claim 19 further comprising:

a floating check valve member carried within said hollow body and being operative to preclude refrigerant flow through said refrigerant flow passage in a second direction opposite from said first direction when said control structure is in said first position.

* * * * *